United States Patent
Belotserkovsky

(10) Patent No.: US 8,559,563 B2
(45) Date of Patent: Oct. 15, 2013

(54) PSEUDO TONE-BASED SYMBOL TIMING RECOVERY AND CARRIER TRACKING LOOP DETECTORS FOR VESTIGIAL SIDEBAND RECEIVERS

(75) Inventor: Maxim Belotserkovsky, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 479 days.

(21) Appl. No.: 12/735,371

(22) PCT Filed: Jan. 14, 2008

(86) PCT No.: PCT/US2008/000476
§ 371 (c)(1),
(2), (4) Date: Jul. 9, 2010

(87) PCT Pub. No.: WO2009/091356
PCT Pub. Date: Jul. 23, 2009

(65) Prior Publication Data
US 2010/0283903 A1 Nov. 11, 2010

(51) Int. Cl.
*H04L 27/00* (2006.01)
(52) U.S. Cl.
USPC ............ 375/326; 375/321; 375/324; 375/322
(58) Field of Classification Search
USPC ................. 375/321, 316, 320, 326, 324, 322; 348/725, 558, 726
See application file for complete search history.

(56) References Cited

U.S. PATENT DOCUMENTS

| | | | |
|---|---|---|---|
| 5,930,309 A * | 7/1999 | Knutson et al. | 375/340 |
| 6,233,295 B1 * | 5/2001 | Wang | 375/364 |
| 7,072,425 B2 | 7/2006 | Jun et al. | |
| 7,110,475 B2 | 9/2006 | Jun | |
| 7,474,990 B2 * | 1/2009 | Kim | 702/185 |
| 2004/0042571 A1 * | 3/2004 | Bouillet | 375/347 |
| 2004/0136474 A1 | 7/2004 | Hwang | |
| 2004/0165656 A1 * | 8/2004 | Shiue et al. | 375/150 |

FOREIGN PATENT DOCUMENTS

| GB | 2331210 | 5/1999 |
|---|---|---|
| WO | WO9526101 | 9/1995 |

OTHER PUBLICATIONS

Richard D. Gitlin et al("The performance of staggered Quadrature Amplitude Modulation in the presence of phase Jitter", IEEE Transactions on Communications, vol. Com-23, No. 3, Mar. 1975, pp. 348-352).*
Search Rept: Dec. 11, 2008.

* cited by examiner

*Primary Examiner* — Shuwang Liu
*Assistant Examiner* — Helene Tayong
(74) *Attorney, Agent, or Firm* — Robert D. Shedd; Joseph J. Opalach

(57) ABSTRACT

A receiver is an ATSC (Advanced Television Systems Committee)-receiver and comprises a pseudo-tone based carrier tracking loop and symbol timing recovery loop comprising one, or more, detectors for providing at least two pseudo tone (PST) signals. The first PST signal drives the carrier tracking loop and the second PST signal drives the symbol timing recovery loop. The detector provides the first PST signal such that the first PST signal is determined as a function of carrier offset excluding symbol-timing offset; and provides the second PST signal such that the second PST signal is determined as a function of symbol timing offset excluding carrier offset.

6 Claims, 12 Drawing Sheets

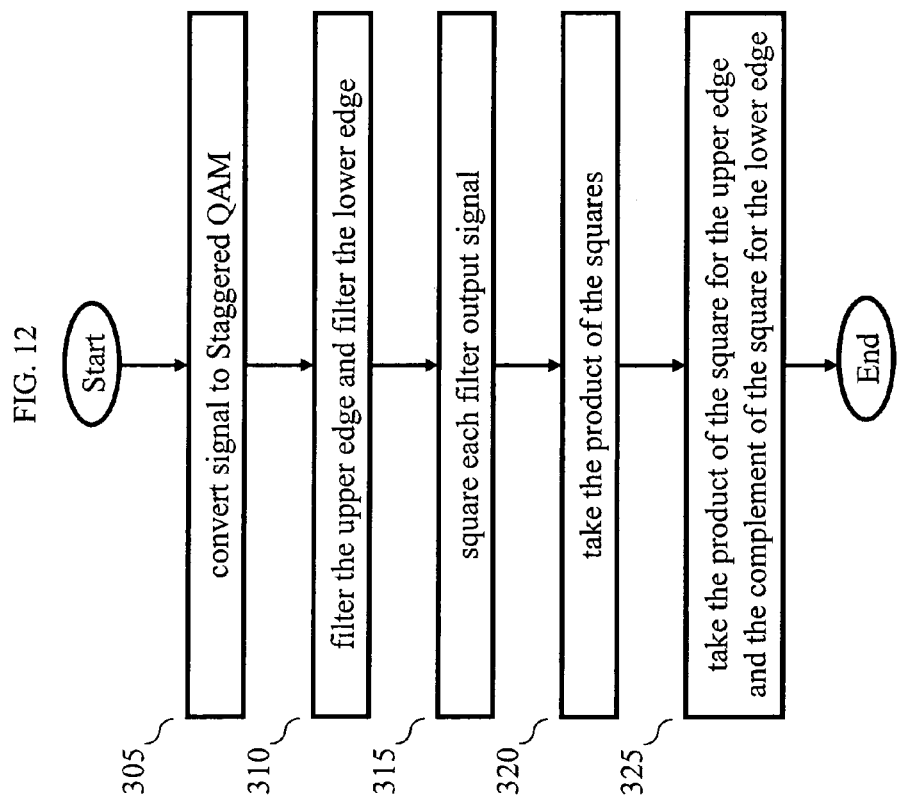

PSEUDO TONE-BASED SYMBOL TIMING RECOVERY AND CARRIER TRACKING LOOP DETECTORS FOR VESTIGIAL SIDEBAND RECEIVERS

This application claims the benefit, under 35 U.S.C. §365 of International Application PCT/US2008/000476, filed Jan. 14, 2008, which was published in accordance with PCT Article 21(2) on Jul. 23, 2009 in English.

BACKGROUND OF THE INVENTION

The present invention generally relates to communications systems and, more particularly, to a receiver.

In the ATSC (Advanced Television Systems Committee) standard for digital terrestrial television (DTV) in the United States (e.g., see, United States Advanced Television Systems Committee, "ATSC Digital Television Standard", Document A/53, Sep. 16, 1995), the modulation system consists of a suppressed carrier vestigial sideband (VSB) modulation with an added small in-phase pilot at the suppressed carrier frequency, 11.3 dB below the average signal power, at the lower VSB signal edge. An illustrative frequency spectrum for an ATSC VSB signal is shown in FIG. 1.

In most communications systems, such as ATSC, the receiver uses "blind" algorithms to perform carrier and timing synchronization with the transmitted waveform, where the algorithms do not use any information about the transmitted symbols. For example, an ATSC receiver utilizes the above-noted small in-phase pilot tone to achieve carrier frequency lock, after which some other blind method, such as the well-known Gardner's algorithm, is used to achieve symbol-timing lock. However, when methods such as Gardner's algorithm are used with an ATSC VSB signal, they are sensitive to the carrier lock, such that if the carrier frequency lock is disturbed (e.g., when channel reflections distort pilot magnitude and/or phase), the symbol timing recovery (STR) loop will also be adversely affected. The opposite may also be true, when degradation in the STR performance leads to a corresponding degradation in the carrier tracking loop (CTL) performance. In addition, with the two functions being interrelated, the receiver's acquisition of a new transponder channel may take longer than it otherwise would.

Besides the above-described pilot-based CTL method and Gardner-based STR method, other methods, such as the well-known Costas loop, may be used to achieve the same goal: a squaring loop acting on the lower (pilot) edge of the received near-baseband VSB signal would produce a pseudo-tone (PST) whose frequency location indicates carrier offset, while the squaring loop acting on the opposite edge of the VSB signal would produce a pseudo-tone whose location relative to the pilot (or pseudo-pilot) indicates the symbol-timing offset. For this scheme to work, the lower PST is being driven to DC by the CTL, while the upper PST is being driven to 5.38 MHz (in ATSC) away from DC by the STR. However, as the loops converge, they may chase one after another, thus producing unwanted effects, such as delay in acquisition and instability. In addition, since the PST for the symbol timing offset is still generated relative to the location of the pilot, symbol timing lock is still adversely affected if the pilot is distorted in magnitude and/or phase.

SUMMARY OF THE INVENTION

As noted above, symbol timing recovery (STR) performance is dependent on the carrier tracking loop (CTL) performance. However, I have realized that it is possible to separate the STR performance from the performance of the CTL such that degradation in CTL performance does not degrade STR performance. In particular, and in accordance with the principles of the invention, a receiver comprises a symbol timing recovery loop; and a carrier tracking loop, wherein the carrier tracking loop and the symbol timing recovery loop are driven as a function of pseudo-tones developed from both edges of an staggered quadrature amplitude modulated (SQAM) version of the received signal.

In an embodiment of the invention, the receiver is an ATSC-receiver and comprises a pseudo-tone based carrier tracking loop and symbol timing recovery loop comprising one, or more, detectors for providing at least two pseudo tone (PST) signals. The first PST signal drives the carrier tracking loop and the second PST signal drives the symbol timing recovery loop. The detector provides the first PST signal such that the first PST signal is determined as a function of carrier offset excluding symbol-timing offset; and provides the second PST signal such that the second PST signal is determined as a function of symbol timing offset excluding carrier offset.

In view of the above, and as will be apparent from reading the detailed description, other embodiments and features are also possible and fall within the principles of the invention.

BRIEF DESCRIPTION OF THE DRAWINGS

FIG. 12 shows an illustrative method in accordance with the principles of the invention.

DETAILED DESCRIPTION

Other than the inventive concept, the elements shown in the figures are well known and will not be described in detail. Also, familiarity with television broadcasting, receivers and video encoding is assumed and is not described in detail herein. For example, other than the inventive concept, familiarity with current and proposed recommendations for TV standards such as NTSC (National Television Systems Committee), PAL (Phase Alternation Lines), SECAM (SEquential Couleur Avec Memoire) and ATSC (Advanced Television Systems Committee) (ATSC) is assumed. Further information on ATSC broadcast signals can be found in the following ATSC standards: Digital Television Standard (A/53), Revision C, including Amendment No. 1 and Corrigendum No. 1, Doc. A/53C; and *Recommended Practice: Guide to the Use of the ATSC Digital Television Standard* (A/54). Likewise, other than the inventive concept, transmission concepts such as eight-level vestigial sideband (8-VSB), Quadrature Amplitude Modulation (QAM), orthogonal frequency division multiplexing (OFDM) or coded OFDM (COFDM)), and receiver components such as a radio-frequency (RF) front-end, receiver section, low noise block, tuners, demodulators, Hilbert filters, carrier tracking loop, correlators, leak integrators and squarers, etc., is assumed. Similarly, other than the inventive concept, formatting and encoding methods (such as Moving Picture Expert Group (MPEG)-2 Systems Standard (ISO/IEC 13818-1)) for generating transport bit streams are well-known and not described herein. Also, those skilled in the art appreciate that carrier recovery involves processing in the real and the complex domains. It should also be noted that the inventive concept may be implemented using conventional programming techniques, which, as such, will not be described herein. Finally, like-numbers on the figures represent similar elements.

Figure 1:
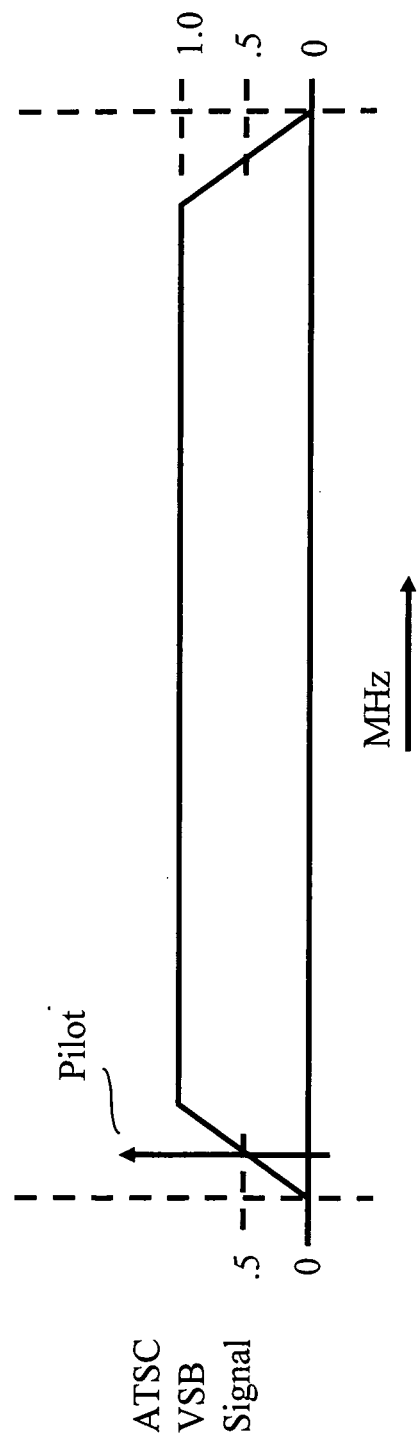
FIG. 1 shows an illustrative ATSC VSB signal spectrum.
Figure 2:
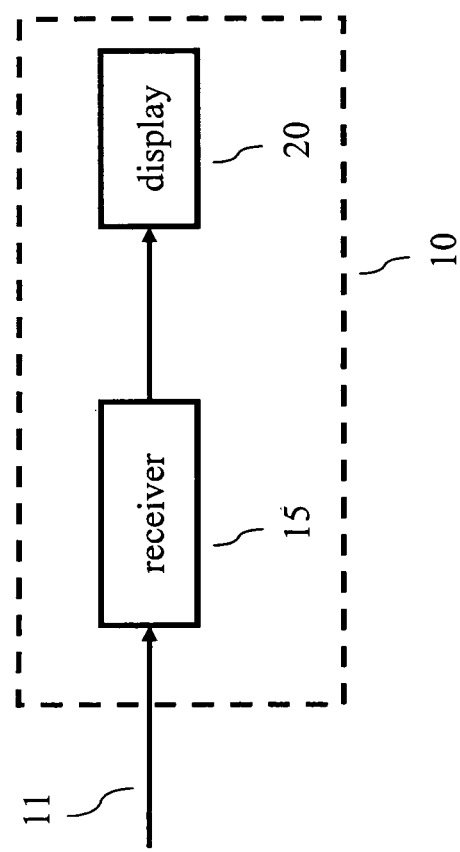
FIG. 2 shows an illustrative high-level block diagram of an apparatus embodying the principles of the invention.

A high-level block diagram of an illustrative apparatus 10 in accordance with the principles of the invention is shown in FIG. 2. Apparatus 10 includes a receiver 15 and a display 20. Illustratively, receiver 15 is an ATSC-compatible receiver. It should be noted that receiver 15 may also be NTSC (National Television Systems Committee)-compatible, i.e., have an NTSC mode of operation and an ATSC mode of operation such that apparatus 10 is capable of displaying video content from an NTSC broadcast or an ATSC broadcast. For simplicity in describing the inventive concept, only the ATSC mode of operation is described herein. Receiver 15 receives a broadcast signal 11 (e.g., via an antenna (not shown)) for processing to recover therefrom, e.g., an HDTV (high definition TV) video signal for application to display 20 for viewing video content thereon. As noted earlier, an illustrative spectrum for an ATSC VSB signal is shown in FIG. 1.

Figure 3:
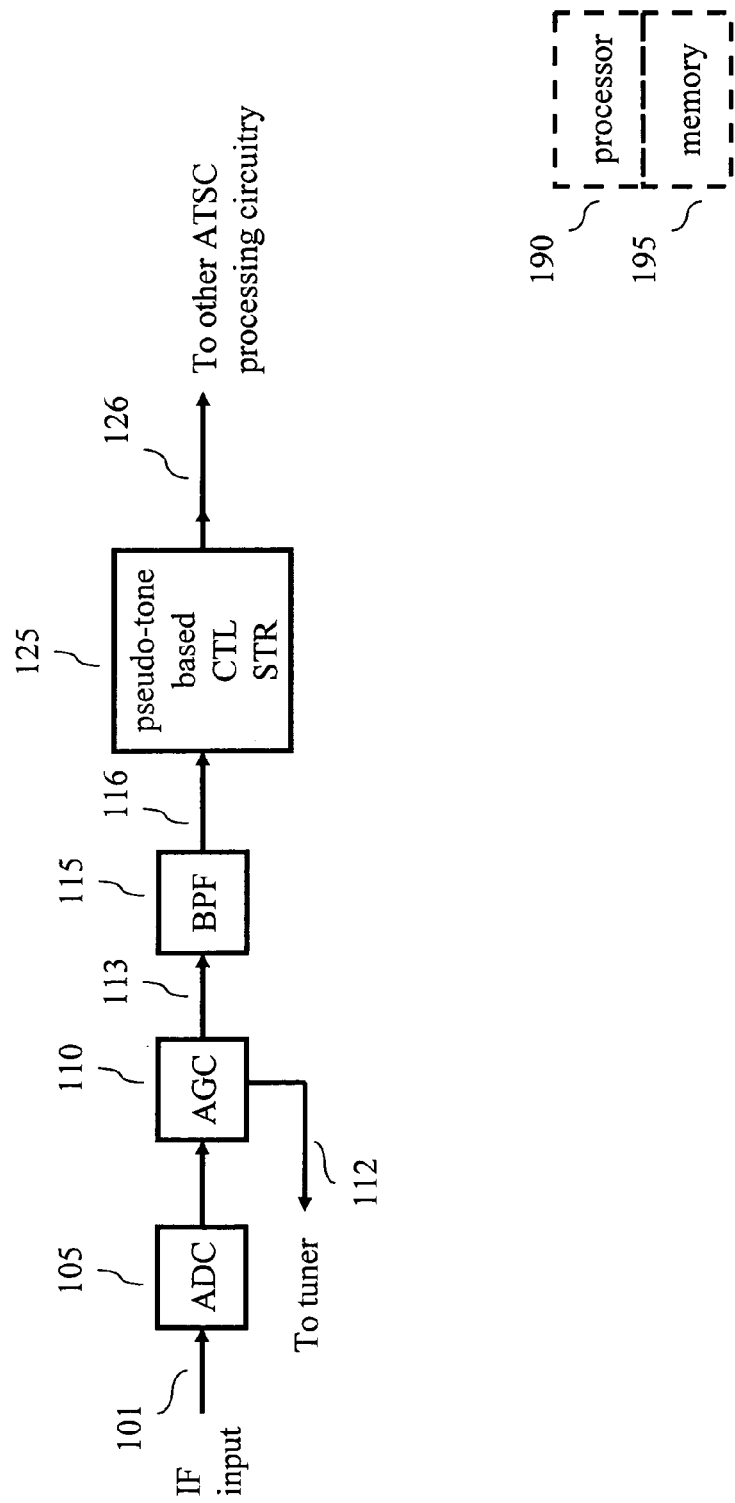
FIG. 3 shows a portion of a receiver embodying the principles of the invention.

Turning now to FIG. 3, that relevant portion of receiver 15 in accordance with the principles of the invention is shown. In particular, receiver 15 includes analog-to-digital converter (ADC) 105, automatic gain control (AGC) 110, band-pass filter (BPF) 115 and pseudo-tone based carrier and tracking loop (CTL) and symbol timing recovery (STR) loop 125, which operates in accordance with the principles of the invention. Receiver 15 is a processor-based system and includes one, or more, processors and associated memory as represented by processor 190 and memory 195 shown in the form of dashed boxes in FIG. 3. In this context, computer programs, or software, are stored in memory 195 for execution by processor 190. The latter is representative of one, or more, stored-program control processors and these do not have to be dedicated to the receiver function, e.g., processor 190 may also control other functions of receiver 15 (or apparatus 10). Memory 195 is representative of any storage device, e.g., random-access memory (RAM), read-only memory (ROM), etc.; may be internal and/or external to receiver 15; and is volatile and/or non-volatile as necessary.

Input signal 101 represents a digital VSB modulated signal in accordance with the above-mentioned "ATSC Digital Television Standard" and is centered at a specific IF (Intermediate Frequency) of $F_{IF}$ Hertz (provided by a tuner (not shown)). Input signal 101 is sampled by ADC 105 for conversion to a sampled signal, which is then gain controlled by AGC 110. The latter is noncoherent and is a mixed mode (analog and digital) loop that provides a first level of gain control (prior to carrier tracking), symbol timing and sync detection of the VSB signal included within signal 101. AGC 110 basically compares the absolute values of the sampled signal from ADC 105 against a predetermined threshold, accumulates the error and feeds that information, via signal 112, back to the tuner (not shown) for gain control prior to ADC 105. As such, AGC 110 provides a gain controlled signal 113 to BPF 115, which is centered at the IF frequency ($F_{IF}$) and has a bandwidth equal to 6 MHz (millions of hertz). The output signal 116 from BPF 115 is then passed through pseudo-tone based CTL and STR loop 125, which processes signal 116 in accordance with the principles of the invention to down convert the IF signal to baseband and correct for carrier timing and symbol timing. In particular, pseudo-tone based CTL and STR loop 125 processes signal 116 such that the symbol timing recovery loop operates independently of the carrier tracking loop. Pseudo-tone based CTL and STR loop 125 provides a down-converted received signal 126. The latter is provided to other portions (not shown) of receiver 15 for recovery of the data conveyed therein.

Figure 4:
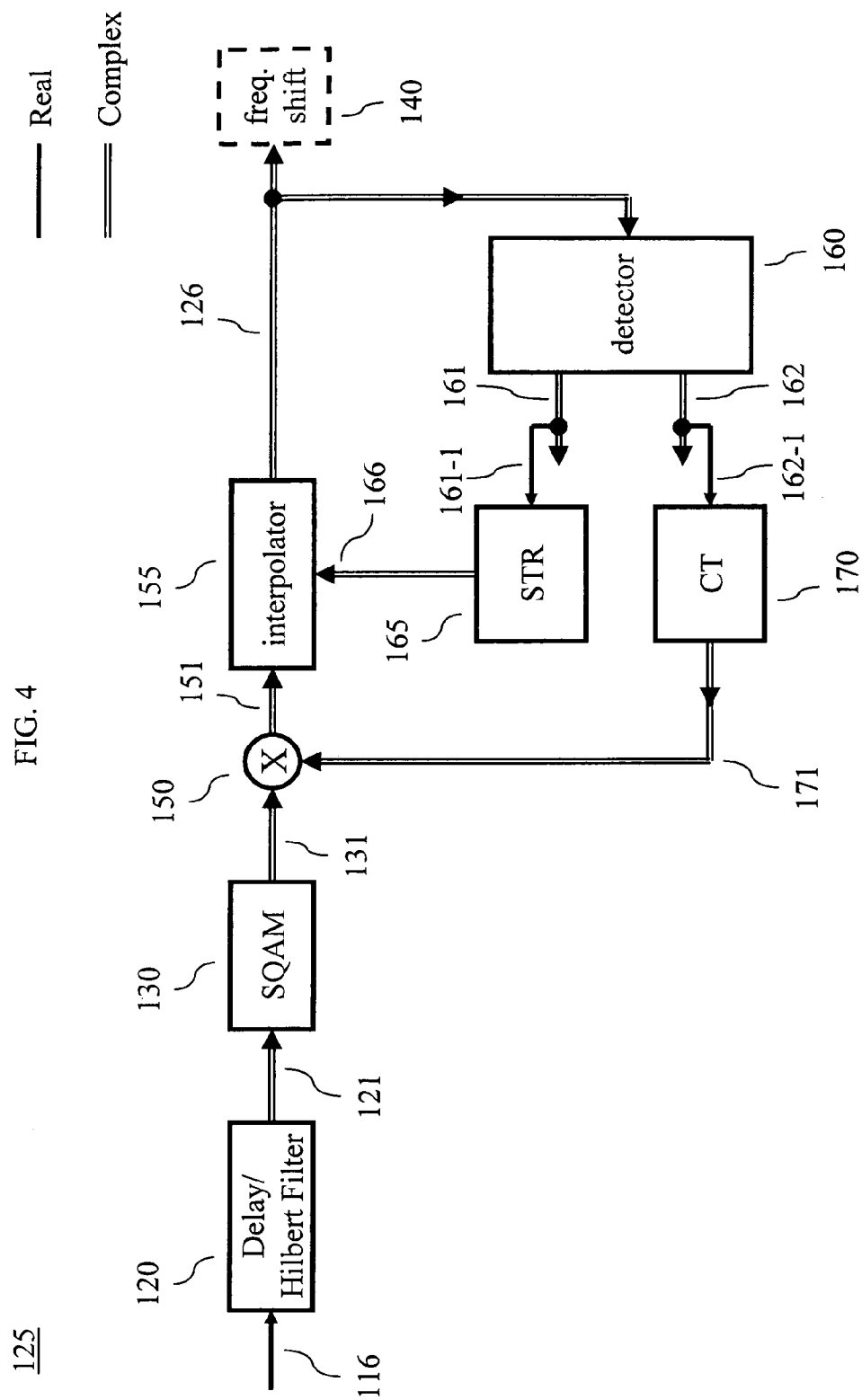
FIG. 4 shows an illustrative embodiment of a pseudo-tone based CTL and STR element embodying the principles of the invention for use in the receiver of FIG. 3.

Reference should now be made to FIG. 4, which shows an illustrative embodiment of pseudo-tone based CTL and STR loop 125 in accordance with the principles of the invention. Pseudo-tone based CTL and STR loop 125 includes delay/Hilbert filler 120, Staggered Quadrature Amplitude Modulator (SQAM) element 130, multiplier (derotator) 150, interpolator 155, detector 160, symbol timing recovery (STR) element 165 and carrier tracking (CT) element 170.

Delay/Hilbert filter element 120 includes a Hilbert filter and an equivalent delay line that matches the Hilbert filter processing delay. As known in the art, a Hilbert Filter is an all-pass filter that introduces a −90° phase shift to all input frequencies greater than 0 (and a +90° degree phase shift to negative frequencies). The Hilbert filter allows recovery of the quadrature component of the output signal 116 from BPF 115. In order for the CTL to correct the phase and lock to the ATSC IF carrier both the in-phase and quadrature components of the signal are needed.

Figure 5:
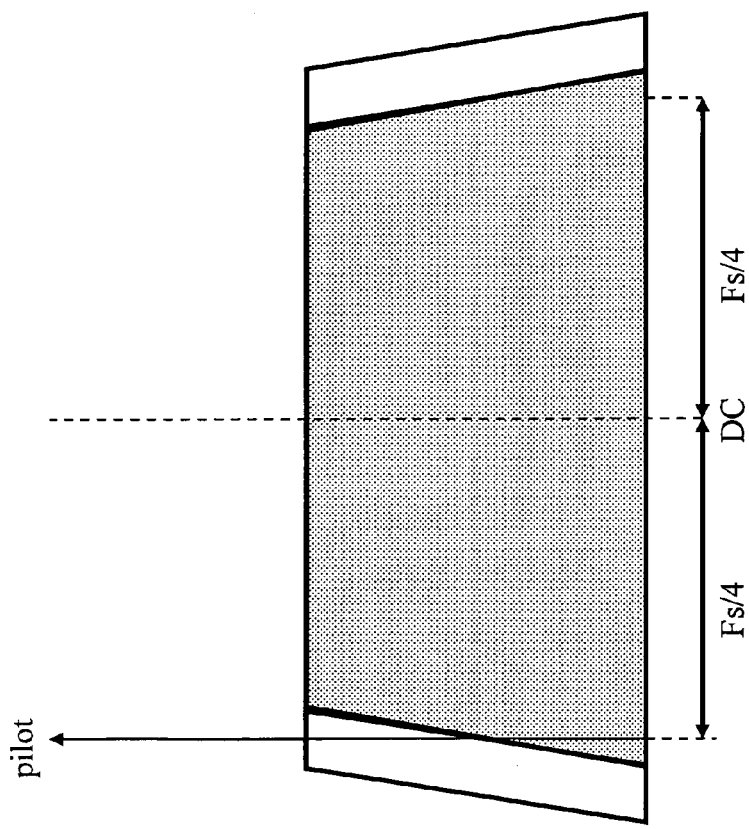
FIGS. 5-7 illustrate various frequency spectrums for use in understanding the inventive concept.

The output signal 121 from delay/Hilbert filter element 120 is a complex sample stream comprising in-phase (I) and quadrature (Q) components. It should be noted that complex signal paths are shown as double lines in the figures. Output signal 121 is applied to SQAM element 130. The latter processes output signal 121 such that the signal 131 entering multiplier 150 is a staggered QAM (SQAM) signal, not a VSB signal. A staggered QAM signal is in essence the same as a VSB signal only with the center of its spectrum (rather than the lower band-edge) located near DC, i.e., the SQAM signal is the complex baseband VSB signal sampled at 1× symbol rate (10.76 MHz in ATSC) and then shifted down by Fs/4. An illustrative frequency spectrum of SQAM signal 131 is illustrated in FIG. 5. The white area around the shaded portion of the frequency spectrum reflects the spectrum being "stretched" because the sampling frequency is, in this illustration, lower than required.

Returning to FIG. 4, multiplier 150 receives SQAM signal 131 and performs de-rotation of the sample stream by a calculated phase angle. For example, the in-phase and quadrature components of signal 131 are rotated by a phase. The latter is provided by signal 171, which represents particular sine and cosine values provided by CT element 170. CT element 170 comprises, e.g., a loop filter, NCO and a sin/cos table as known in the art. The output signal, 151, from multiplier 150 is applied to interpolator 155, which generates a sequence of time interpolated samples synchronized to the transmitter symbol rate. The symbol timing for interpolator 155 is adjusted by STR element 165 via signal 166. The output of interpolator 155, and for that matter pseudo-tone based CTL and STR loop 125, is down-converted received signal 126, which represents a de-rotated complex sample stream. It should be noted that signal 126 should be shifted up in frequency to its traditional VSB position before the transmitted symbols are extracted. This frequency shift element 140 is represented in dashed-line form shown in FIG. 4 and, e.g., could be a part of the demodulator portion (not shown) of receiver 15 that processes signal 126. As can be observed from FIG. 4, down-converted received signal 126 is also applied to detector 160, which, and in accordance with the principles of the invention, provides at least two pseudo tone (PST) signals: 161 and 162. A component signal of PST signal 162, e.g., the imaginary component, 162-1, drives CT element 170 for performing carrier recovery and a component signal of PST 161, e.g., the imaginary component, 161-1, drives STR element 165 for performing symbol timing recovery. Detector 160 provides PST 162 such that PST 162 is determined as a function of carrier offset excluding symbol-timing offset. Similarly, detector 160 provides PST 161 such that PST 161 is determined as a function of symbol timing offset excluding carrier offset.

Figure 6:
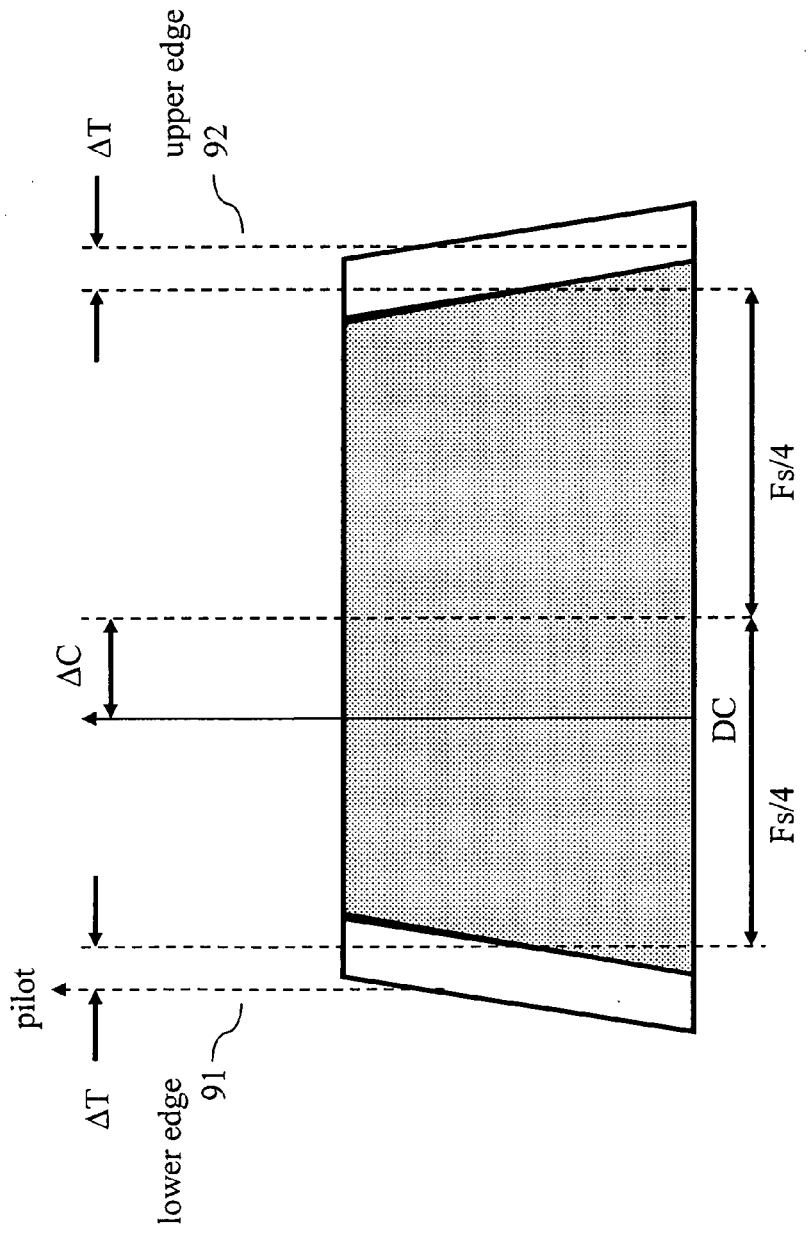
Figure 7:
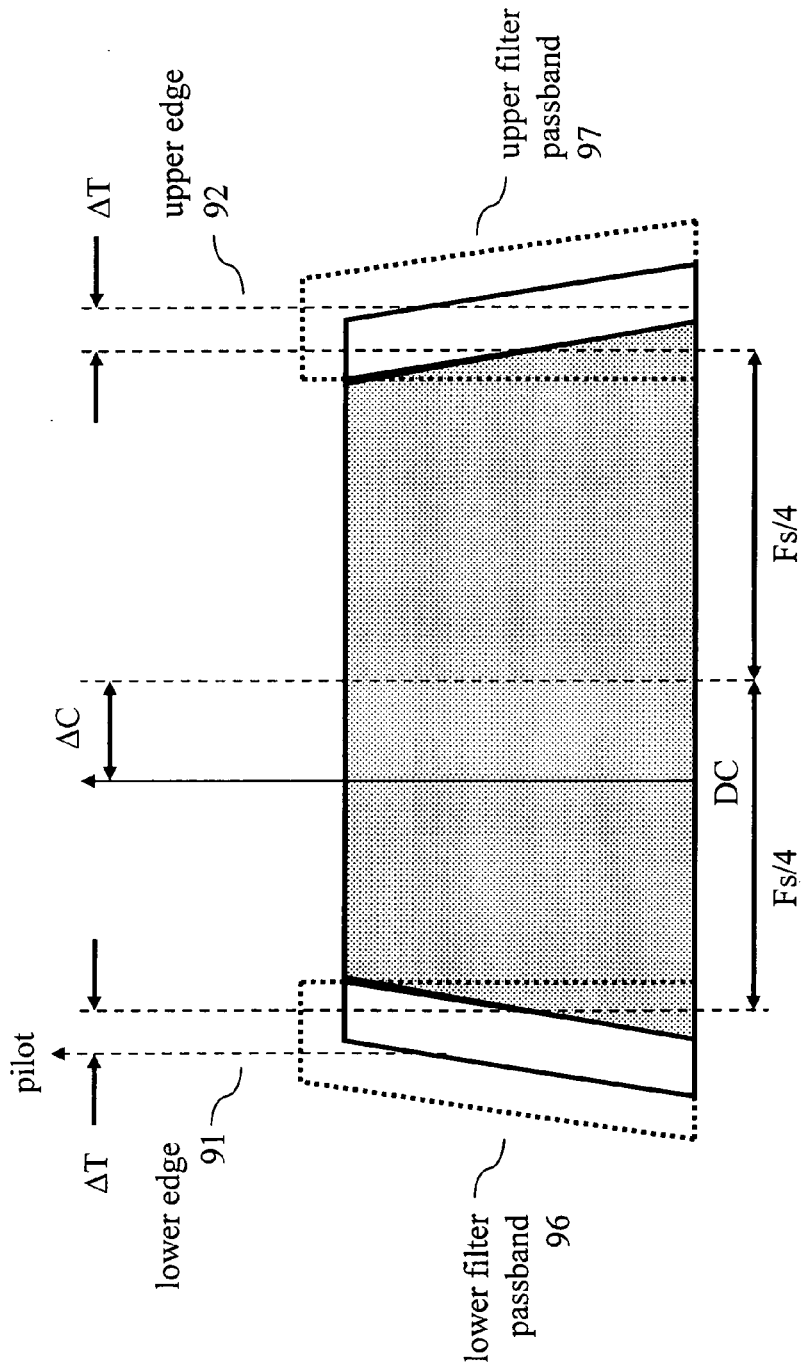

Before describing an illustrative embodiment of detector 160, attention should now be directed to FIGS. 5, 6 and 7, which further illustrate the inventive concept. As noted above, SQAM signal 131, as illustrated in FIG. 5, is in essence the same as a VSB signal only with the center of its frequency spectrum (rather than the lower band-edge) located near DC. In this regard, the conceptual effects of carrier offset and symbol timing offset on this frequency spectrum are further illustrated in FIG. 6. In FIG. 6, $\Delta C$ is the spectral shift of the Nyquist edges due to carrier offset (with respect to DC), and $\Delta T$ is the spectral shift due to symbol-timing offset. As such, the upper Nyquist edge (upper edge 92 in FIG. 6) is then centered around $(F_s/4+\Delta C+\Delta T)$, while the lower Nyquist edge (lower edge 91 in FIG. 6) is centered at $(-F_s/4+\Delta C-\Delta T)$. In accordance with the principles of the invention, detector 160 operates on these two edges for producing the at least two PST signals. This is illustrated in FIG. 7, where a lower filter operates on the lower edge—represented by a passband 96 of the lower filter shown in dotted-line form; while an upper filter operates on the upper edge—represented by a passband 97 of the upper filter shown in dotted-line form.

Figure 8:
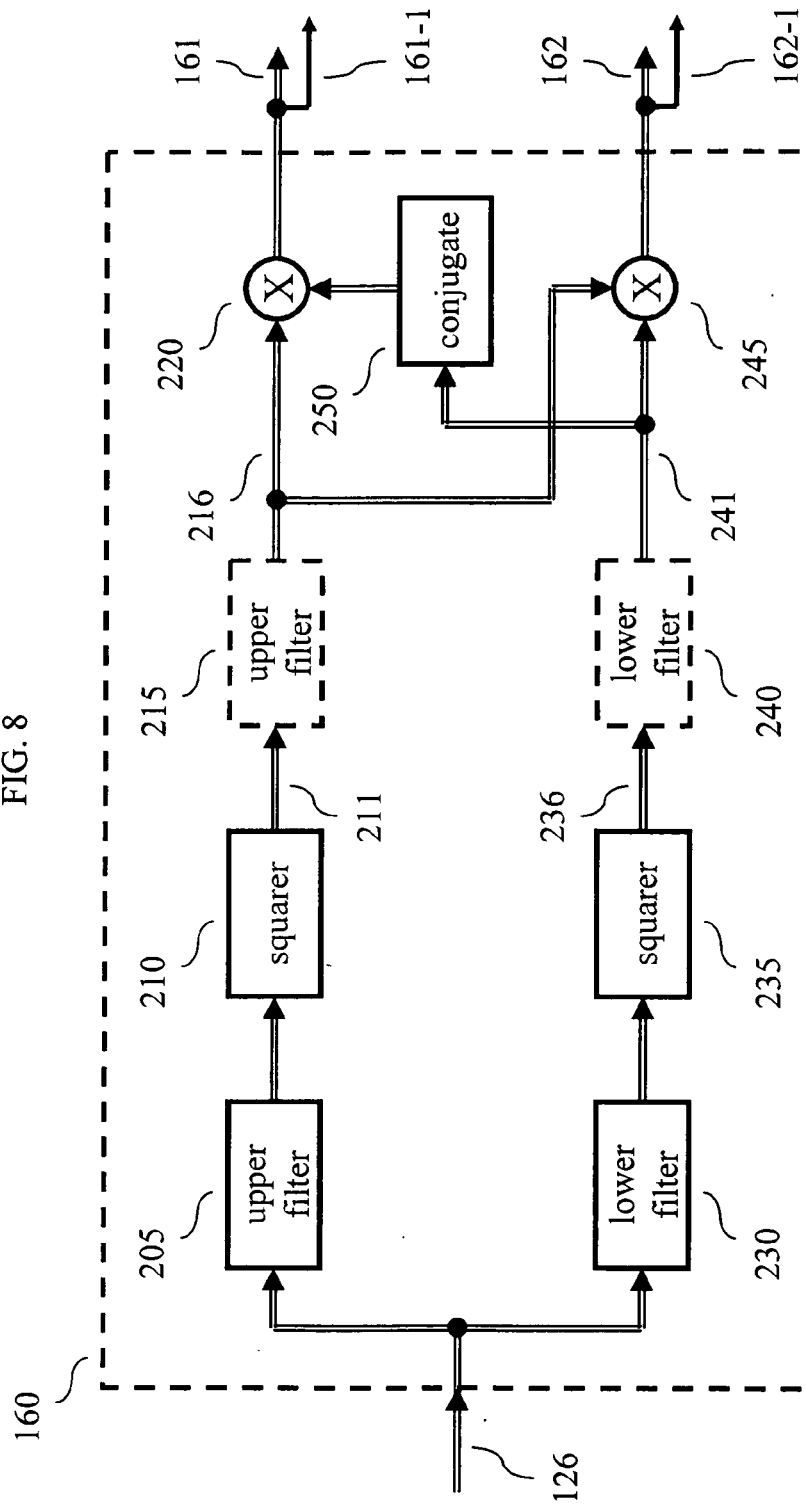
FIG. 8 shows an illustrative embodiment of a detector in accordance with the principles of the invention.

Referring now to FIG. 8, an illustrative embodiment of detector 160 in accordance with the principles of the invention is shown. Detector 160 comprises upper filter 205 and lower filter 230, squarers 210 and 235, multipliers 220 and 245, and conjugate element 250. Upper filter 215 and upper filter 240 are shown in dashed-line form as being optional (explained below). Upper filter 205 filters the upper edge of signal 126 (passband 97 of FIG. 7); while lower filter 230 filters the lower edge of signal 126 (passband 96 of FIG. 7). Each filter output signal is then individually squared to produce pseudo tones. In particular, squarer 210 provides a PST 211, which is located at $(F_s/2+2\Delta C+2\Delta T)$; and squarer 235 provides a PST 236, which is located at $(-F_s/2+2\Delta C-2\Delta T)$. At this point, additional filtering can be optionally performed by respective upper filter 215 and lower filter 240 to remove unwanted spectral components created by the squaring operation. Multiplier 245 forms the product of the upper branch and the lower branch to provide a PST 162; while multiplier 220 forms the product of the upper branch and the complex conjugate of the lower branch (via conjugate element 250) to provide a PST 161. As a result, it can be easily shown that the product of the upper branch and lower branch (PST 162) will have a strong PST at $(4\Delta C)$, while the product of the upper branch and complex conjugate of the lower branch (PST 161) will have a similar PST at $(4\Delta T)$. Thus, and in accordance with the principles of the invention, the PST locations of these pseudo tones are determined by either carrier or sampling offset—but not by both. This key fact makes it possible to decouple the STR and the CTL. As noted above, a component of PST 162 drives CT element 170 and a component of PST 161 drives STR element 165.

Figure 9:
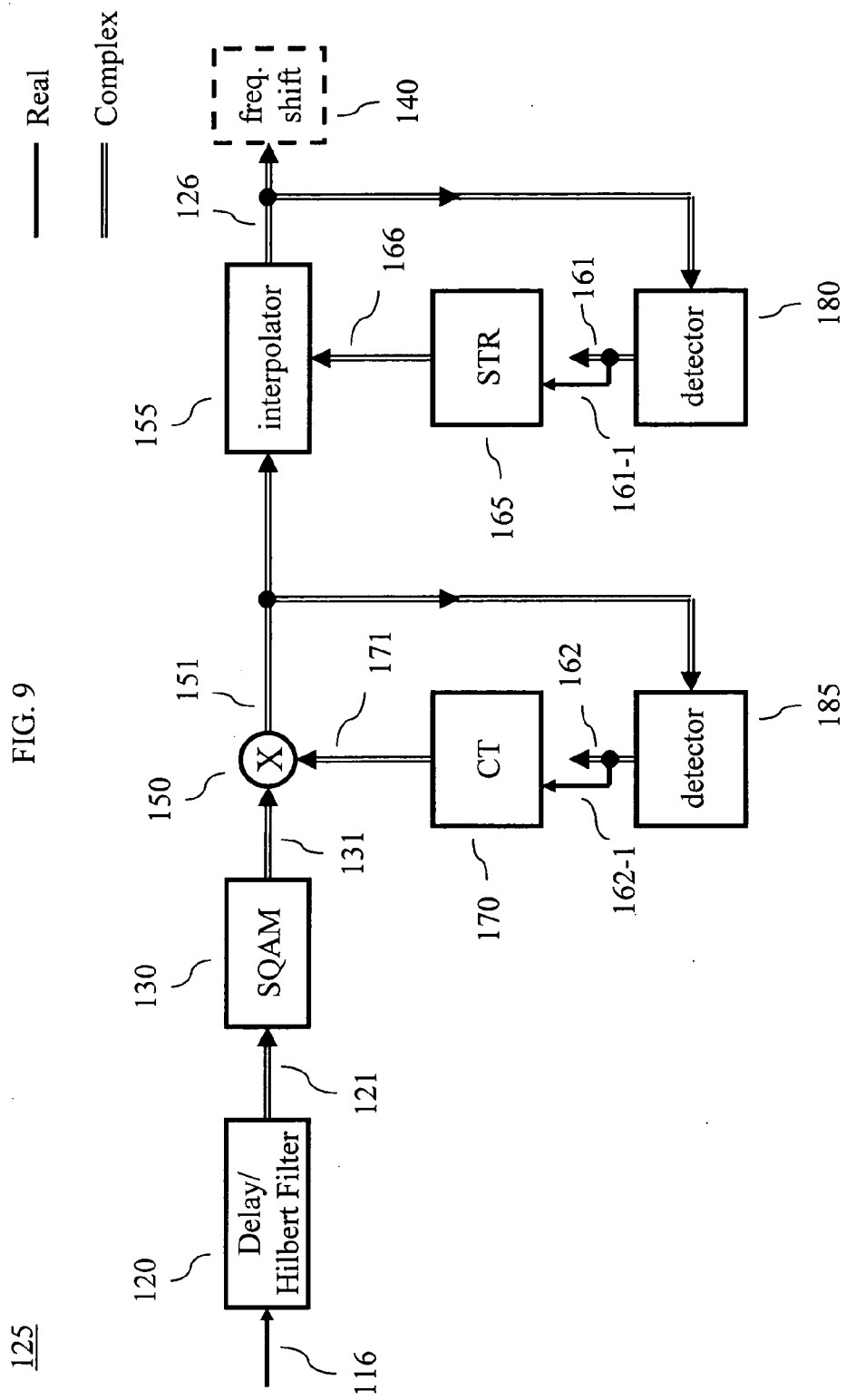
FIG. 9 shows another illustrative embodiment of a pseudo-tone based CTL and STR element embodying the principles of the invention for use in the receiver of FIG. 3.
Figure 10:
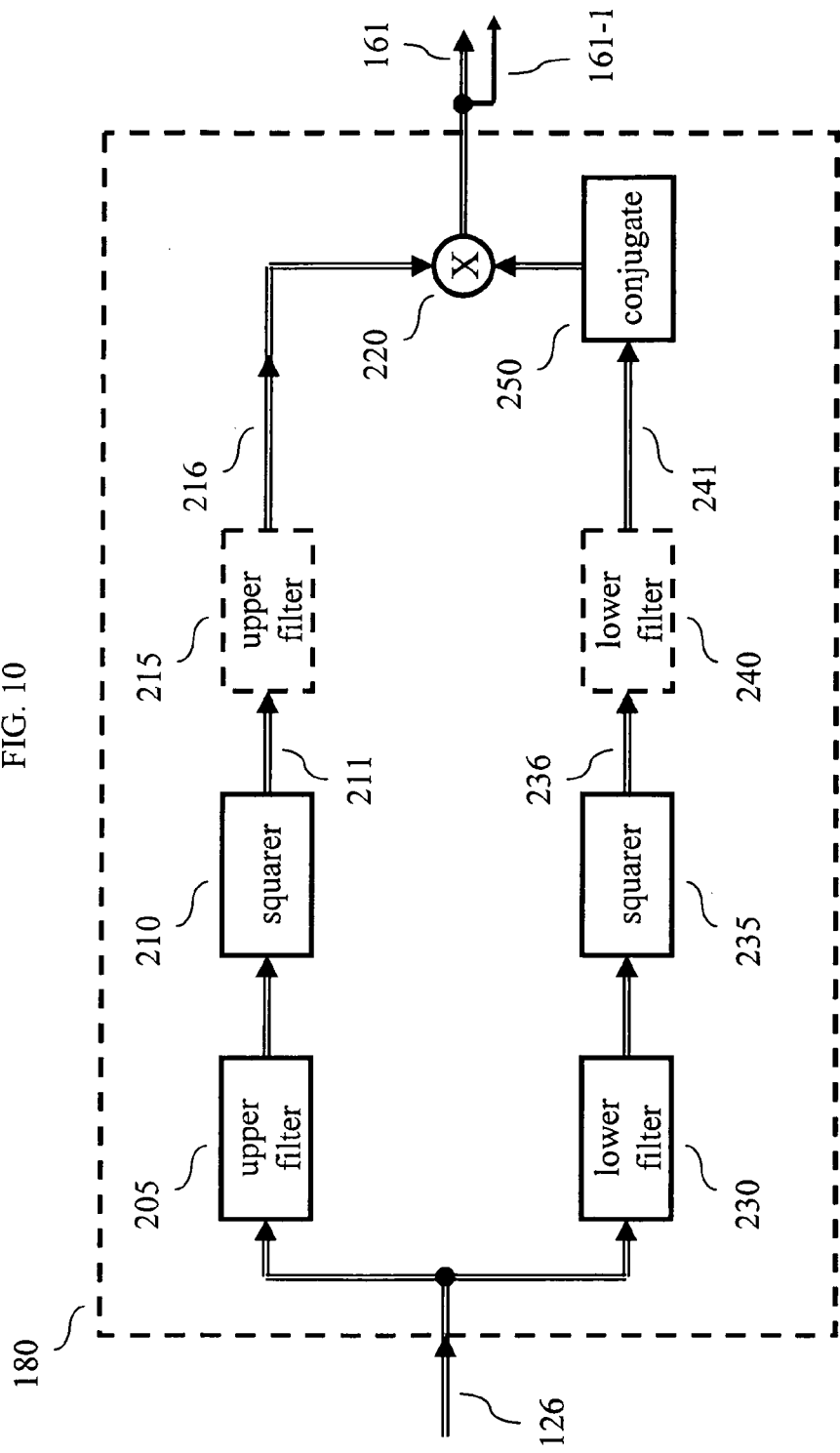
FIGS. 10 and 11 show illustrative embodiments of detectors for use in the embodiment of FIG. 9.
Figure 11:
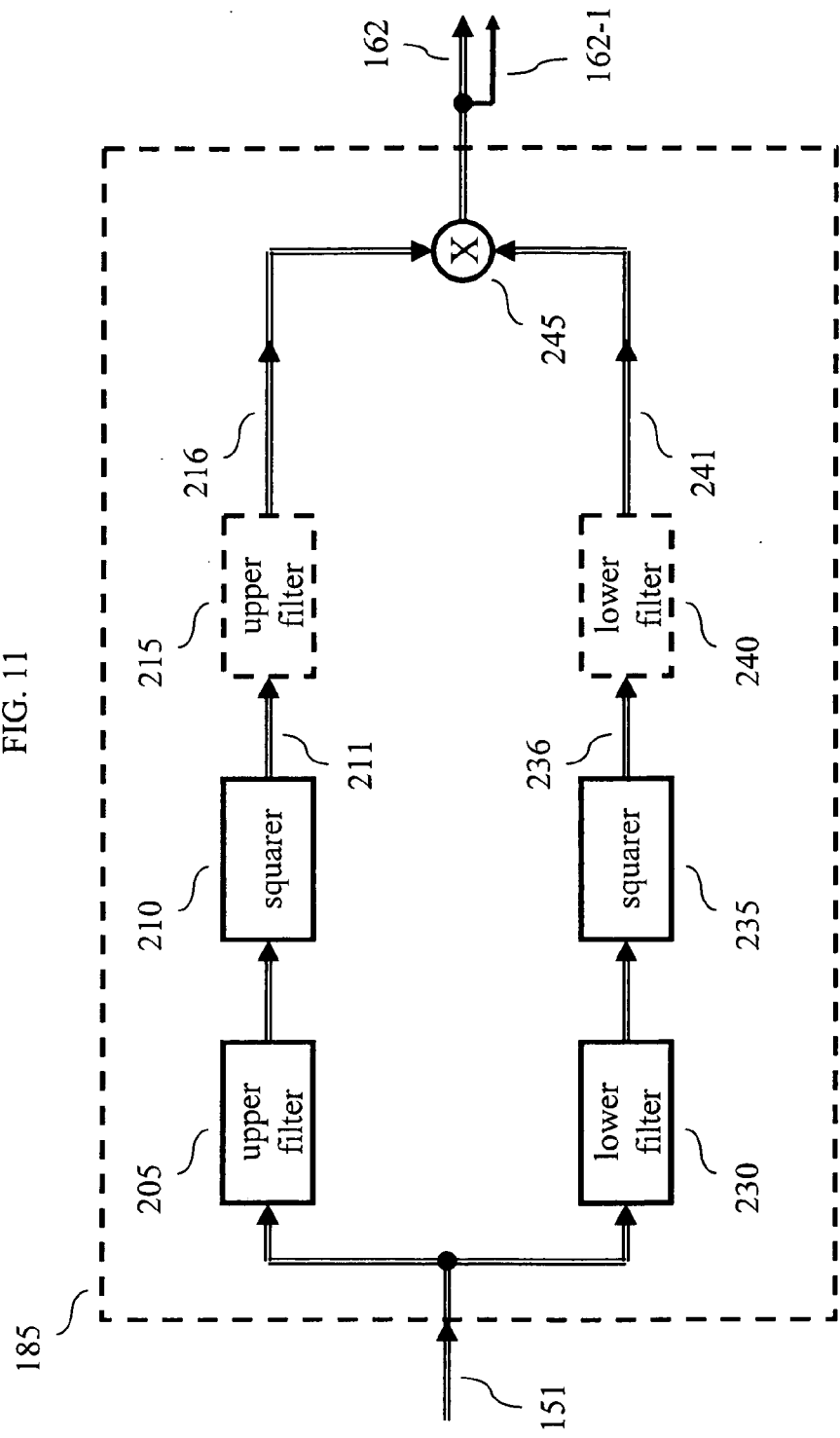

Returning briefly to FIG. 4, it can be observed that this illustrative architecture has the STR loop (interpolator 155, detector 160 and STR element 165) nested inside of the CTL (interpolator 155, detector 160, CT element 170 and multiplier 150), with detector 160 generating PST signals 161 and 162 as described above. Since PST 161 does not contain information about the carrier offset, STR element 165 now operates independently from CT element 170. However, in this exemplary implementation, since PST 162 is generated after interpolator 155, CTL convergence is still dependent on STR. In this regard, another illustrative embodiment of pseudo-tone based CTL and STR loop 125 in accordance with the principles of the invention is shown in FIG. 9. The elements of FIG. 9 are similar to that of FIG. 4 except for the use of two detectors—detector 180 and detector 185. As shown in FIGS. 10 and 11, these detectors are similar to detector 160 except that each produces a particular PST signal for use in either carrier tracking or symbol timing recovery. It should also be noticed that detector 185 processes signal 151 from multiplier 150. It can be observed from FIG. 9 that this illustrative embodiment now represents a symmetric architecture—both CTR and STR operate independently of each other.

Turning now to FIG. 12, an illustrative flow chart in accordance with the principles of the invention is shown for use in performing carrier recovery and symbol timing recovery independent of each other. In step 305, receiver 15 converts a signal to a Staggered QAM signal for further processing. In step 310, receiver 15 filters an upper edge and a lower edge of the Staggered QAM signal for providing an upper filter output signal and a lower filter output signal, respectively. In step 315, receiver 15 squares each filter output signal to provide a squared upper filter output signal and a squared lower filter output signal. In step 320, receiver 15 forms a product of the squared upper filter output signal and the squared lower filter output signal for providing a pseudo tone for use in carrier recovery. Finally, in step 325, receiver 15 forms a product of the squared upper filter output signal and a conjugate of the squared lower filter output signal for providing a pseudo tone for use in symbol timing recovery.

As described above, the inventive concept describes an advantageous way to perform carrier and symbol-timing recovery in a communications system, such as an ATSC-compliant receiver, such that the two functions can be disentangled from one another thus delivering superior demodulator performance.

It should also be noted that groupings of components for particular elements described and shown herein are merely illustrative. For example, although FIG. 2 shows a display 20 internal to apparatus 10 (such as in a television (TV) set), this is not required and, e.g., display 20 could be external to apparatus 10 and, indeed, located further away. For example, apparatus 10 could be a set-top box or server which further distributes a signal for viewing on display 20.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, any or all of the elements (e.g., of FIGS. 3, 4 and 9) may be implemented in a stored-program-controlled processor, e.g., a digital signal processor, which executes associated software, e.g., corresponding to one, or more, of the steps shown in, e.g., FIG. 12. Further, the principles of the invention are applicable to other types of communications systems, e.g., satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention as defined by the appended claims.

The invention claimed is:

1. Apparatus for use in a receiver, the apparatus comprising:
    a carrier tracking loop for tracking a carrier in a received signal; and
    a symbol timing recovery loop for tracking symbol timing in the received signal;
    wherein the carrier tracking loop is driven as a function of a first pseudo tone and the symbol timing recovery loop is driven as a function of a second pseudo tone, the first and second pseudo-tones being developed from both edges of a staggered quadrature amplitude modulated version of the received signal such that the first pseudo tone is determined as a function of carrier offset excluding symbol timing offset, and the second pseudo tone is determined as a function of symbol timing offset excluding carrier offset;
    wherein the first and second pseudo-tones are provided by a detector that filters a lower edge and an upper edge of the staggered quadrature amplitude modulated version of the received signal;
    the detector further comprising:
        an upper filter for filtering the upper edge of the staggered quadrature amplitude modulated version of the received signal for providing a filtered upper signal;
        a lower filter for filtering the lower edge of the staggered quadrature amplitude modulated version of the received signal for providing a filtered lower signal;
        a squarer for squaring the filtered upper signal for providing a squared upper signal;
        a squarer for squaring the filtered lower signal for providing a squared lower signal;
        a multiplier for providing the first pseudo tone representing a product of the squared upper signal and the squared lower signal; and
        a multiplier for providing the second pseudo tone representing a product of the squared upper signal and a conjugate of the squared lower signal.

2. The apparatus of claim 1, the detector further comprising:
    additional filters for further filtering the squared lower signal and the squared upper signal.

3. The apparatus of claim 1, wherein the received signal is an ATSC (Advanced Television Systems Committee) VSB (Vestigial Sideband) modulated signal.

4. A method for use in a receiver, the method comprising:
    tracking a carrier in a received signal; and
    tracking symbol timing in the received signal;
    wherein the carrier tracking is driven as a function of a first pseudo tone and the symbol timing recovery tracking is driven as a function of a second pseudo tone, the first and second pseudo-tones being developed from both edges of a staggered quadrature amplitude modulated version of the received signal such that the first pseudo tone is determined as a function of carrier offset excluding symbol timing offset, and the second pseudo tone is determined as a function of symbol timing offset excluding carrier offset;
    wherein the first and second pseudo-tones are provided by:
        filtering a lower edge and an upper edge of the staggered quadrature amplitude modulated version of the received signal;
    the filtering step comprising:
        filtering the upper edge of the staggered quadrature amplitude modulated version of the received signal for providing a filtered upper signal;
        filtering the lower edge of the staggered quadrature amplitude modulated version of the received signal for providing a filtered lower signal;
        squaring the filtered upper signal for providing a squared upper signal;
        squaring the filtered lower signal for providing a squared lower signal;
        providing the first pseudo tone representing a product of the squared upper signal and the squared lower signal; and
        providing the second pseudo tone representing a product of the squared upper signal and a conjugate of the squared lower signal.

5. The method of claim 4 further comprising:
    further filtering the squared lower signal and the squared upper signal before providing the pseudo tones.

6. The method of claim 4, wherein the received signal is an ATSC (Advanced Television Systems Committee) VSB (Vestigial Sideband) modulation signal.

* * * * *